United States Patent
Kitazawa et al.

(10) Patent No.: US 11,169,121 B2
(45) Date of Patent: Nov. 9, 2021

(54) ULTRASONIC FLAW DETECTION METHOD AND APPARATUS

(71) Applicant: Hitachi-GE Nuclear Energy, Ltd., Ibaraki (JP)

(72) Inventors: Sou Kitazawa, Tokyo (JP); Hidetaka Komuro, Hitachi (JP); Junichiro Naganuma, Hitachi (JP); Kazuya Ehara, Hitachi (JP)

(73) Assignee: HITACHI-GE NUCLEAR ENERGY, LTD., Hitachi (JP)

( * ) Notice: Subject to any disclaimer, the term of this patent is extended or adjusted under 35 U.S.C. 154(b) by 159 days.

(21) Appl. No.: 16/703,919

(22) Filed: Dec. 5, 2019

(65) Prior Publication Data

US 2020/0209195 A1    Jul. 2, 2020

(30) Foreign Application Priority Data

Dec. 27, 2018  (JP) .............................. JP2018-245628

(51) Int. Cl.
*G01N 29/06* (2006.01)
*G01N 29/24* (2006.01)
(Continued)

(52) U.S. Cl.
CPC .......... *G01N 29/07* (2013.01); *G01N 29/0654* (2013.01); *G01N 29/2437* (2013.01);
(Continued)

(58) Field of Classification Search
CPC .............. G01N 29/0654; G01N 29/07; G01N 2291/0289; G01N 2291/015;
(Continued)

(56) References Cited

U.S. PATENT DOCUMENTS 5,497,662 A * 3/1996 Dykes .................. G01N 29/043
73/598
6,640,632 B1 * 11/2003 Hatanaka ............. G01N 29/043
73/598
(Continued)

FOREIGN PATENT DOCUMENTS

DE          3715914      * 12/1988   ............. G01N 29/26

OTHER PUBLICATIONS

Ultrasonic Testing III 2017, The Japanese Society for Non-Destructive Inspection, pp. 98-101.

*Primary Examiner* — Jacques M Saint Surin
(74) *Attorney, Agent, or Firm* — Mattingly & Malur, PC (57) ABSTRACT

An ultrasonic flaw detection method and device identifies echoes appearing in flaw detection images. By selecting and controlling combinations of transmitting elements and receiving elements, plural waveform signals c are recorded. For each position in an inspection object, intensities of plural waveform signals are extracted based on the propagation time of ultrasonic waves and are totalized. A flaw detection image showing distribution of totalized intensities is generated. By selectively using at least three sound velocities for calculating propagation time of ultrasonic waves, at least three flaw detection images are generated. The areas of at least three echoes respectively appearing in the flaw detection images are calculated and the echo area which is the smallest is identified according to whether or not the flaw detection image showing the echo is one generated using one of a longitudinal sound velocity, a transverse sound velocity and a medium sound velocity.

10 Claims, 9 Drawing Sheets

(51) Int. Cl.
*G01N 29/44* (2006.01)
*G01N 29/07* (2006.01)

(52) U.S. Cl.
CPC ... *G01N 29/4454* (2013.01); *G01N 2291/011* (2013.01); *G01N 2291/0289* (2013.01); *G01N 2291/044* (2013.01); *G01N 2291/106* (2013.01)

(58) Field of Classification Search
CPC ....... G01N 2291/044; G01N 2291/011; G01N 2291/0428
USPC .......................................................... 73/598
See application file for complete search history.

(56) References Cited

U.S. PATENT DOCUMENTS

| | | | | |
|---|---|---|---|---|
| 7,900,516 B2* | 3/2011 | Fukutomi | .......... | G01N 29/2487 73/598 |
| 7,987,724 B2* | 8/2011 | Takada | ............... | G01N 29/2456 73/641 |
| 9,164,064 B2* | 10/2015 | Couse | .................... | G01N 29/12 |

* cited by examiner

| | | RECEIVING ELEMENTS | | | |
|---|---|---|---|---|---|
| | | 1 | 2 | ... | N |
| TRANSMITTING ELEMENTS | 1 | $W_{11}$ | $W_{12}$ | ... | $W_{1N}$ |
| | 2 | $W_{21}$ | $W_{22}$ | ... | $W_{2N}$ |
| | ... | ... | ... | ... | ... |
| | N | $W_{N1}$ | $W_{N2}$ | ... | $W_{NN}$ |

ULTRASONIC FLAW DETECTION METHOD AND APPARATUS

CROSS-REFERENCE TO RELATED APPLICATION

The present application claims priority from Japanese application JP 2018-245628, filed on Dec. 27, 2018, the contents of which is hereby incorporated by reference into this application.

BACKGROUND

The present invention relates to an ultrasonic flaw detection method and apparatus in which an array sensor including plural piezoelectric elements is used.

Ultrasonic flaw detection methods are non-destructive inspection methods used, for example, in nuclear power plants, and one of them is a Phased Array (PA) method. In the PA method, an array sensor having plural piezoelectric elements is used. For example, when flaw detection is performed using longitudinal waves, by controlling timing of transmission of plural ultrasonic waves transmitted from plural piezoelectric elements (that is, phases of plural elementary waves) based on the delay time calculated for each piezoelectric element using a longitudinal sound velocity, the focal position of the ultrasonic beam composed of such plural ultrasonic waves is controlled. When a reflection source is present at the focal position, ultrasonic waves reflected from the reflection source are received by plural piezoelectric elements and are converted into plural waveform signals. Then, by adjusting the time axes of the plural waveform signals based on the delay time calculated for each piezoelectric element, the plural waveform signals are synthesized into a composite waveform signal. In this way, eventually, a flaw detection image is generated which shows distribution of intensities (amplitudes) of plural composite waveform signals corresponding to plural focal positions.

An issue to be considered regarding ultrasonic flaw detection methods is the evaluation of flaw detection images. For example, when flaw detection is performed using a longitudinal wave as described above, whether or not a flaw is present is determined based on a longitudinal echo (true echo) appearing in a flaw detection image. Specifically, if a longitudinal echo appears at a position different from any known reflection source, it is determined that an unknown reflection source (that is, a flaw) is present and the position is evaluated. However, in a flaw detection image, pseudo echoes other than a longitudinal echo (specifically, for example, transverse echoes and mode conversion echoes) often appear at positions different from any real reflection position. Distinguishing between true echoes and pseudo echoes is difficult even for those with expertise. For example, "Ultrasonic Flaw Detection Test III 2017," The Japanese Society for Non-Destructive Inspection, discloses a method of identifying echoes appearing in plural flaw detection images in which either an array sensor is moved or array sensors with different ultrasonic frequencies are used.

A longitudinal echo represents an ultrasonic wave propagated, after being propagated from a piezoelectric element to a reflection source as a longitudinal wave, from the reflection source to a piezoelectric element as a longitudinal wave. A transverse echo represents an ultrasonic wave propagated, after being propagated from a piezoelectric element to a reflection source as a transverse wave, from the reflection source to a piezoelectric element as a transverse wave. A mode conversion echo represents an ultrasonic wave propagated, after being propagated from a piezoelectric element to a reflection source as one of a longitudinal wave and a transverse wave, from the reflection source to a piezoelectric element as the other of a longitudinal wave and a transverse wave.

In recent years, as a new ultrasonic flaw detection method, a technique called Full Matrix Capture (FMC)/Total Focusing Method (TFM) or Synthetic Aperture Focusing Technique (SAFT) has been attracting attention. In the method, as in the PA method, an array sensor having plural piezoelectric elements is used, and, by selecting combinations of transmitting elements and receiving elements among the plural piezoelectric elements and controlling the selected combinations, plural waveform signals corresponding to the combinations of transmitting elements and receiving elements are recorded. Namely, instead of simultaneously driving plural piezoelectric elements and transmitting a composite waveform signal, one piezoelectric element is driven and elementary waves are transmitted. Also, instead of recording a composite signal generated by synthesizing plural waveform signals, plural waveform signals corresponding to combinations of transmitting elements and receiving elements are recorded.

For each position in an inspection object, on the assumption that ultrasonic waves are reflected from the position, intensities of plural waveform signals corresponding to the position are extracted based on the propagation time of the ultrasonic waves, the extracted waveform signal intensities are totalized, and a flaw detection image showing distribution of totalized intensities corresponding to plural positions in the inspection object is generated. Generally, a longitudinal wave velocity or a transverse wave velocity is used as a sound velocity for calculating the propagation time of ultrasonic waves.

SUMMARY

As described above, identifying echoes appearing in flaw detection images is difficult even for those with expertise in ultrasonic flaw detection. Moreover, the method disclosed in the above non-patent literature takes time for inspection and only those who have expertise can identify echoes appearing in flaw detection images.

An object of the present invention is to provide an ultrasonic flaw detection method and an ultrasonic flaw detection apparatus which make it possible to easily identify echoes appearing in flaw detection images.

To achieve the above object, in the ultrasonic flaw detection method according to a typical present invention: an array sensor including plural piezoelectric elements is used; by selecting combinations of transmitting elements and receiving elements included in the piezoelectric elements, causing the transmitting elements to transmit ultrasonic waves to an inspection object and obtaining waveform signals generated by converting ultrasonic waves reflected from the inspection object and received by the receiving elements, plural waveform signals corresponding to the combinations of the transmitting elements and receiving elements are recorded; and, for each position in the inspection object, when it is assumed that ultrasonic waves are reflected from the each position, intensities of the plural waveform signals corresponding to the each position are extracted based on the propagation time of ultrasonic waves corresponding to the combinations of the transmitting elements and receiving elements, the extracted intensities are totalized, and a flaw detection image showing distribution of totalized intensities is generated. In the ultrasonic flaw detection method: by selectively using, as sound velocities for calculating propagation time of the ultrasonic waves, at least three sound velocities including one of a longitudinal sound velocity, a transverse sound velocity and a medium sound velocity which is an average of the longitudinal and transverse sound velocities, at least three flaw detection images are generated; the areas of at least three echoes respectively shown in the at least three flaw detection images, the at least three echoes being associated as being attributable to a same reflection source, are calculated; and, out of the at least three echoes, an echo whose area is the smallest is selected and is identified according to whether or not the flaw detection image showing the selected echo is one generated using one of a longitudinal sound velocity, a transverse sound velocity and a medium sound velocity.

According to the present invention, echoes appearing in flaw detection images can be easily identified.

DETAILED DESCRIPTION

The present invention uses a technique called Full Matrix Capture (FMC)/Total Focusing Method (TFM) or Synthetic Aperture Focusing Technique (SAFT). A first embodiment of the present invention will be described below with reference to drawings.

Figure 1:
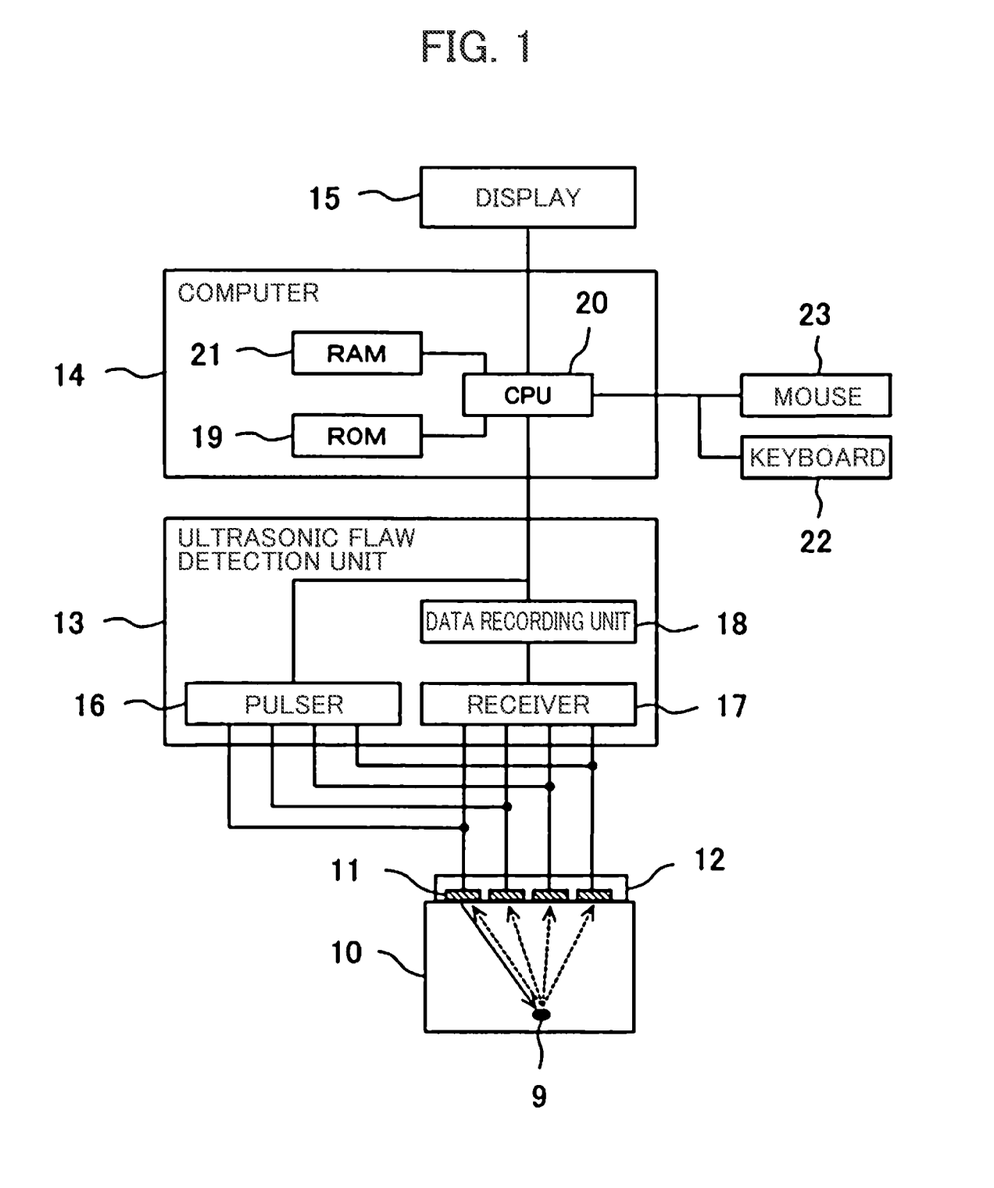
FIG. 1 is a block diagram showing the configuration of the ultrasonic flaw detection apparatus according to a first embodiment of the present invention.
Figure 2:
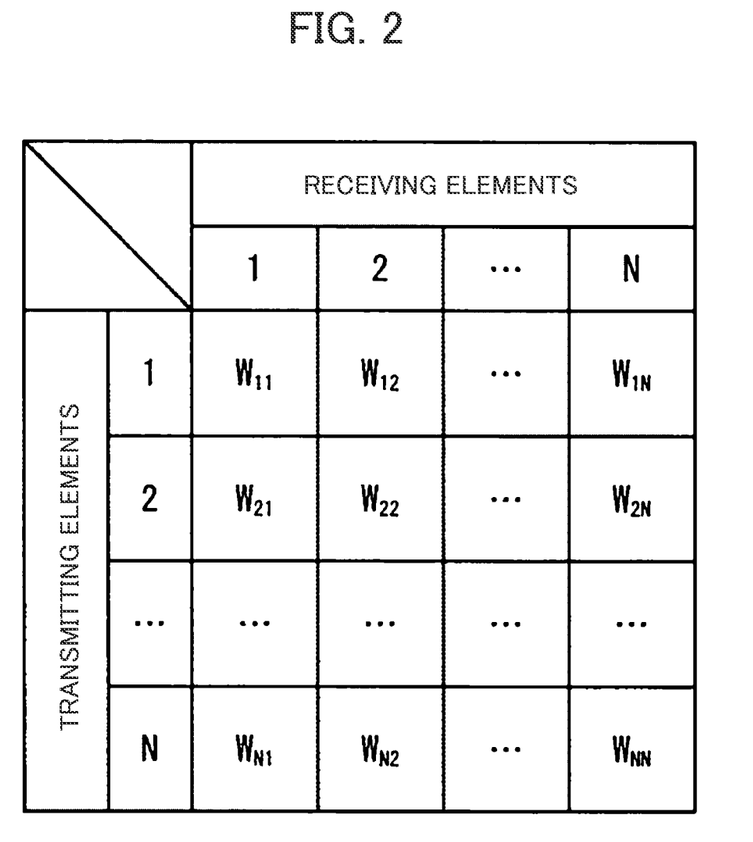
FIG. 2 is a table listing waveform signals corresponding to combinations of transmitting elements and receiving elements according to the first embodiment of the present invention.
Figure 3:
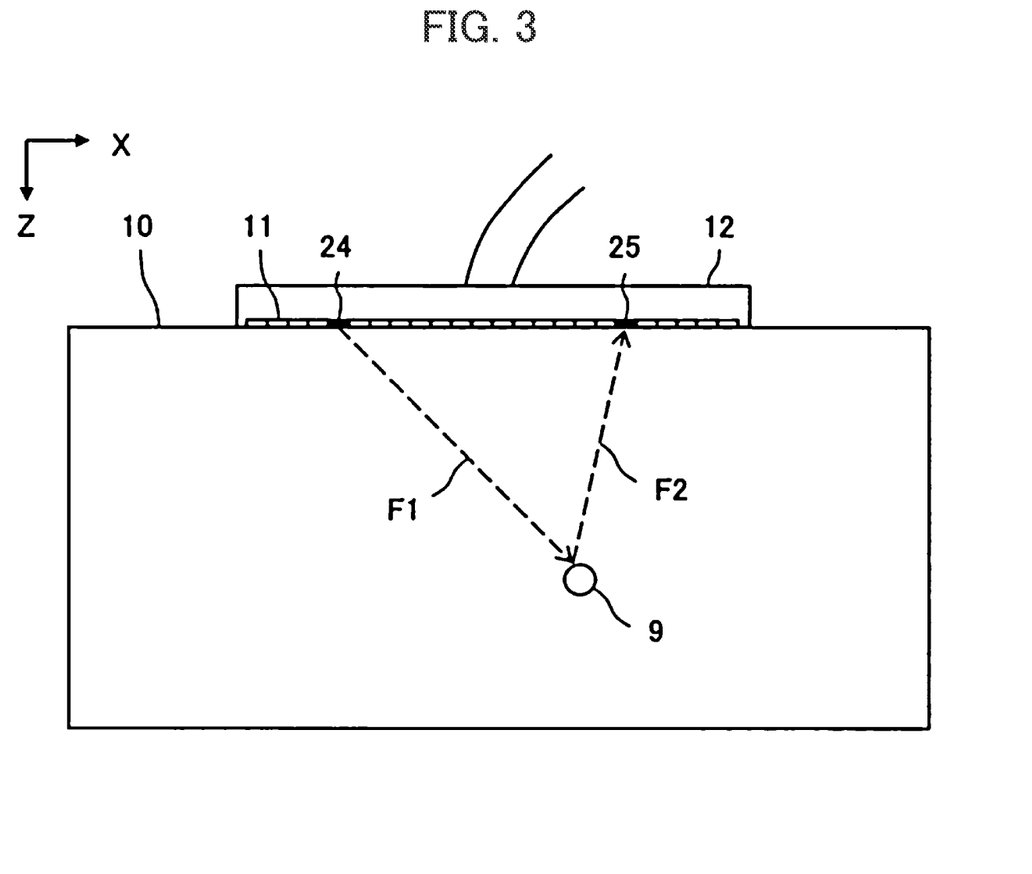
FIG. 3 is a diagram illustrating an example of an ultrasonic wave propagation path in an inspection object according to the first embodiment of the present invention.

FIG. 1 is a block diagram showing the configuration of the ultrasonic flaw detection apparatus according to the present embodiment. FIG. 2 is a table listing waveform signals corresponding to combinations of transmitting elements and receiving elements according to the present embodiment. FIG. 3 is a diagram illustrating an example of an ultrasonic wave propagation path in an inspection object according to the present embodiment.

The ultrasonic flaw detection apparatus of the present embodiment includes an array sensor 12 including plural (N) piezoelectric elements 11, an ultrasonic flaw detection unit 13 which controls the array sensor 12 and records plural waveform signals, a computer 14 which, based on the plural waveform signals recorded by the ultrasonic flaw detection unit 13, generates flaw detection images, and a display 15 which displays, for example, flaw detection images generated by the computer 14. The ultrasonic flaw detection unit 13 includes a pulser 16, a receiver 17 and a data recording unit 18. The data recording unit 18 is configured, for example, with a hard disk or a memory. The computer 14 includes a ROM 19 which stores programs, a CPU 20 which executes programmed processing and a RAM 21 which stores processing results. The computer 14 is connected with input devices such as a keyboard 22 and a mouse 23.

The ultrasonic flaw detection unit 13 is configured to record, by selecting combinations of transmitting elements and receiving elements among the plural piezoelectric elements 11 and controlling them, plural waveform signals corresponding to the selected combinations of transmitting elements and receiving elements.

More specifically, first, a pulser 16 selects a first piezoelectric element 11 as a transmitting element and outputs a drive signal (electric signal) to the first piezoelectric element 11. This causes ultrasonic waves (elementary waves) to be transmitted from the first piezoelectric element 11 to an inspection object 10. Subsequently, each of the piezoelectric elements 11 receives ultrasonic waves reflected from a reflection source 9 (flaw) in the inspection object 10 and, after converting the received ultrasonic waves into a waveform signal, outputs the waveform signal to the receiver 17. With the first piezoelectric element selected as a transmitting element, the receiver 17 selects, for example, all the piezoelectric elements 11 as receiving elements and outputs as many as N waveform signals $W_{11}, W_{12}, \ldots, W_{1N}$ received from the N piezoelectric elements 11 to the data recording unit 18.

Next, the pulser 16 selects a second piezoelectric element 11 as a transmitting element and causes ultrasonic waves to be transmitted from the second piezoelectric element 11. Subsequently, with the second piezoelectric element selected as a transmitting element, the receiver 17 selects, for example, all the piezoelectric elements 11 as receiving elements and outputs as many as N waveform signals $W_{21}, W_{22}, \ldots, W_{2N}$ received from the N piezoelectric elements 11 to the data recording unit 18. In this way, waveform signals are obtained while the combination of a transmitting element and receiving elements is switched. Finally, the pulser 16 selects an Nth piezoelectric element 11 as a transmitting element and causes ultrasonic waves to be transmitted from the Nth piezoelectric element 11. With the Nth piezoelectric element selected as a transmitting element, the receiver 17 selects, for example, all the piezoelectric elements 11 as receiving elements and outputs N waveform signals $W_{N1}, W_{N2}, \ldots, W_{NN}$ received from the N piezoelectric elements 11 to the data recording unit 18.

The data recording unit 18 records the $N^2$ waveform signals (see FIG. 2) obtained as described above together with corresponding information on the combinations of transmitting elements and receiving elements. Theoretically, based on wave reciprocity, the relationship of waveform signal $W_{mn}$=waveform signal $W_{nm}$ (where m=1, 2, ..., N, and n=1, 2, ..., N) holds, so that an alternative method is to record $(N^2+N)/2$ waveform signals $W_{mn}$ or $W_{nm}$ only. However, since there are cases in which wave reciprocity does not hold depending on the characteristics of piezoelectric elements or circuits, $N^2$ waveform signals are recorded in the present embodiment. Note that the combinations of transmitting elements and receiving elements may be changed as necessary, for example, when it is desired to limit the inspection region or when there is a defective piezoelectric element.

For each position in an inspection object, on the assumption that ultrasonic waves are reflected from the position, the computer 14 extracts intensities (amplitudes) of plural waveform signals corresponding to the position based on the propagation time of the ultrasonic waves corresponding to the combinations of transmitting elements and receiving elements, totalizes the extracted waveform signal intensities, and generates a flaw detection image showing distribution of totalized intensities.

More specifically, on the assumption that a reflection source 9 exists at a position (xi, zi) in the inspection object 10 as shown in FIG. 3, ultrasonic waves from a transmitting element 24 propagate along a propagation path F1 to be then reflected at a reflection source 9 and received, after propagating along a propagation path F2, by a receiving element 25. When the position of the transmitting element 24 is (xm, zm), propagation time τmi taken by the ultrasonic waves propagating from the transmitting element 24 to the reflection source 9 is given by the following equation (1). Also, when the position of the receiving element 25 is (xn, zn), the propagation time τni taken by the ultrasonic waves propagating from the reflection source 9 to the receiving element 25 is given by the following equation (2). Therefore, the propagation time taken by the ultrasonic waves propagating from the transmitting element 24 to the receiving element 25 is given as (τmi+τni).

$$\tau_{mi} = \frac{\sqrt{(x_i - x_m)^2 + (z_i - z_m)^2}}{c} \quad (1)$$

$$\tau_{ni} = \frac{\sqrt{(x_i - x_n)^2 + (z_i - z_n)^2}}{c} \quad (2)$$

For each position (xi, zi) in the inspection object 10, the intensities $W_{nm}$ (τmi+τni) of plural waveform signals corresponding to the position (xi, zi) are extracted based on the propagation time of the ultrasonic waves corresponding to the combinations of transmitting elements and receiving elements, and the extracted waveform signal intensities are totalized. Namely, using the following equation (3), the total waveform signal intensity Si corresponding to position (xi, zi) in the inspection object 10 is calculated. The total intensity Si is converted into a pixel value and a flaw detection image showing distribution of total intensities Si corresponding to plural positions in the inspection object 10 is generated.

$$S_i = \sum_{m=1}^{N} \sum_{n=1}^{N} W_{mn}(\tau_{mi} + \tau_{ni}) \quad (3)$$

Figure 5A:
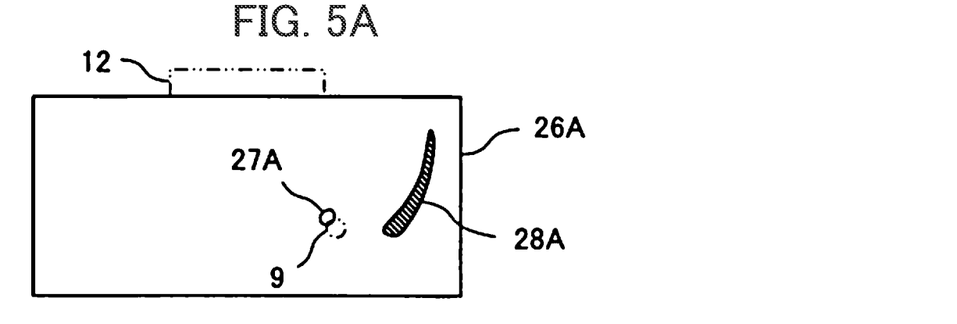
FIGS. 5A to 5D are diagrams respectively showing concrete examples of flaw detection images according to the first embodiment of the present invention.

When longitudinal sound velocity $C_L$ is selected as sound velocity C in the equations (1) and (2), a flaw detection image 26A as shown as an example in FIG. 5A, being described later, is generated. While a longitudinal echo (true echo) appears where the reflection source 9 is located in the flaw detection image 26A, a pseudo echo other than the longitudinal echo (concretely, for example, the transverse echo shown in FIG. 5A or a mode conversion echo, not shown) often appears in a position different from the reflection source 9. As a major feature of the present embodiment, the computer 14 has a function for identifying echoes shown in flaw detection images. This will be described in detail below.

Figure 4:
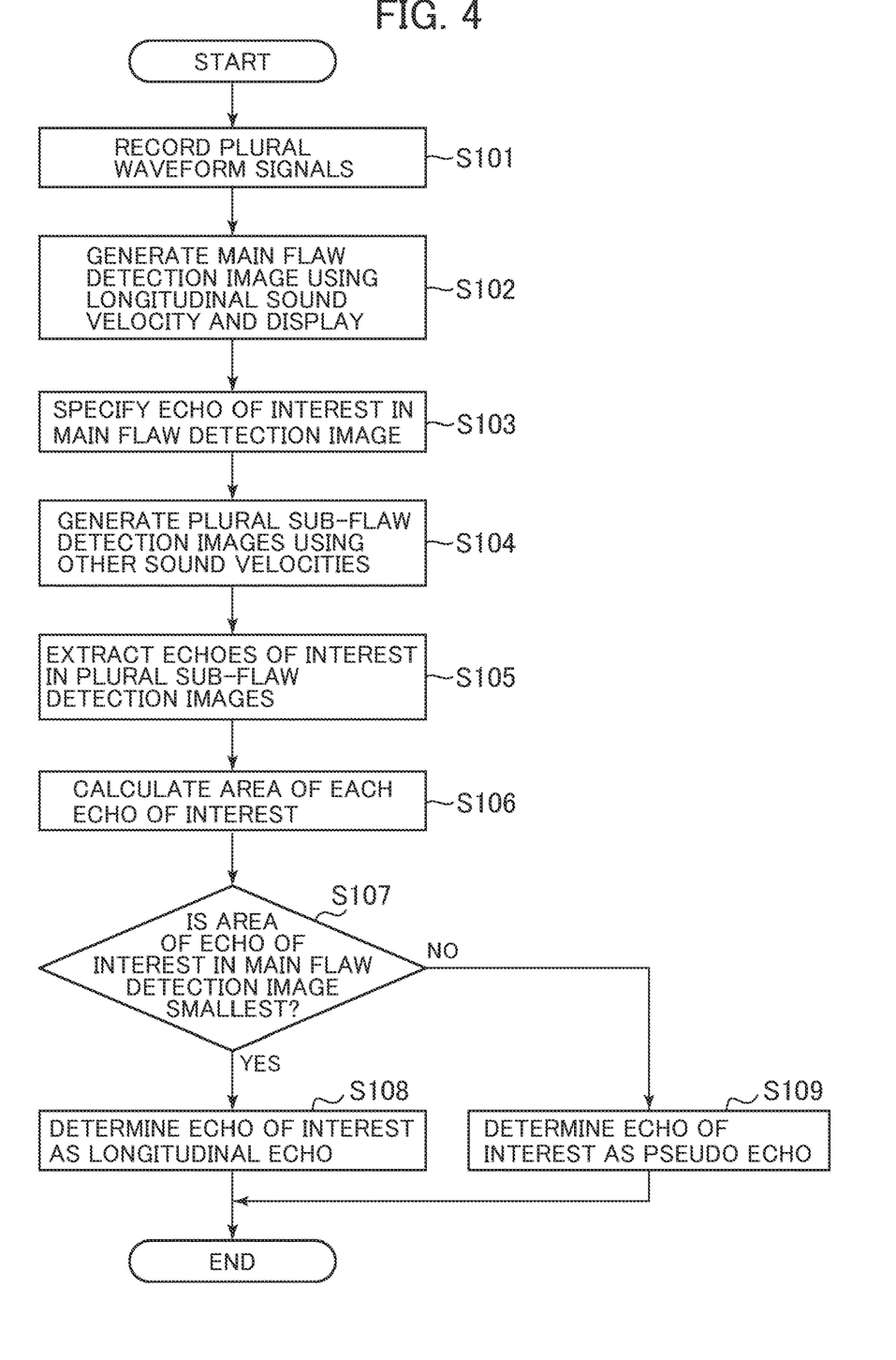
FIG. 4 is a flowchart showing the procedure of processing performed by the ultrasonic flaw detection apparatus according to the first embodiment of the present invention.
Figure 5B:
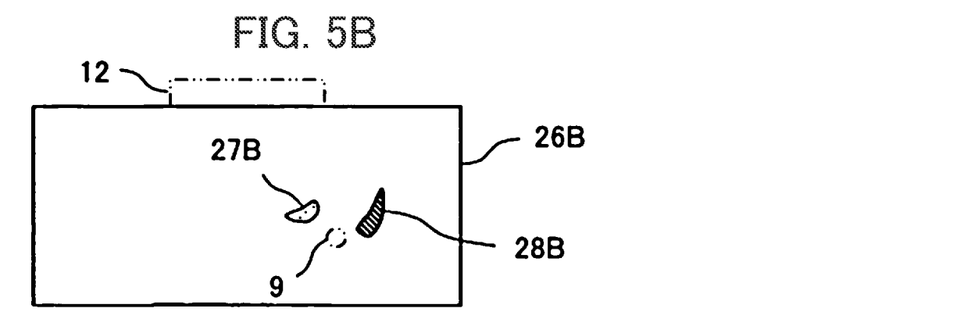
Figure 5C:
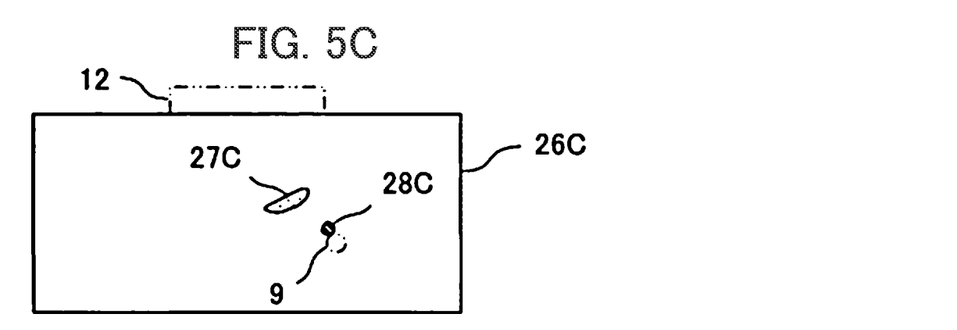
Figure 5D:
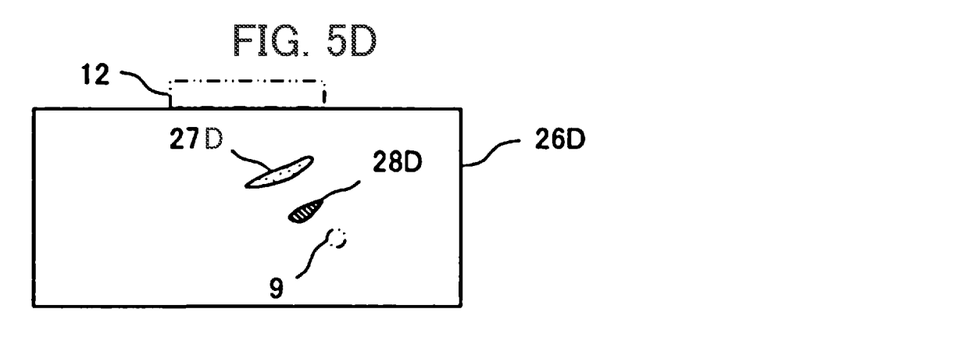

FIG. 4 is a flowchart showing the procedure of processing performed by the ultrasonic flaw detection apparatus of the present embodiment. FIG. 5A is a diagram showing a concrete example of a main flaw detection image according to the present embodiment. FIGS. 5B to 5D are diagrams showing concrete examples of sub-flaw detection images according to the present embodiment. For the purpose of convenience, in FIGS. 5A to 5D, the positions of the array sensor 12 and reflection source 9 are shown.

First in step S101, by selecting combinations of transmitting elements and receiving elements out of the plural piezoelectric elements 11 and controlling the selected combinations, the ultrasonic flaw detection unit 13 records plural waveform signals corresponding to the combinations of transmitting elements and receiving elements. Subsequently, processing advances to step S102 and the computer 14 generates a main flaw detection image 26A (see FIG. 5A) by using a longitudinal sound velocity $C_L$ as sound velocity C for calculating ultrasonic wave propagation time (τmi+τni). The display 15 displays the main flaw detection image 26A generated by the computer 14. Subsequently, processing advances to step S103 and an inspector specifies an echo of interest out of the plural echoes 27A and 28A shown in the main flaw detection image 26A using, for example, the keyboard 22 and the mouse 23.

Next, in step S104, the computer 14 generates at least two sub-flaw detection images by selectively using at least two other sound velocities as sound velocity C for calculating ultrasonic wave propagation time (τmi+τni). The display 15 may display the sub-flaw detection images generated by the computer 14.

Of the two other sound velocities, preferably one is higher than the longitudinal sound velocity $C_L$ and the other is lower than the longitudinal sound velocity $C_L$. Also, the at least two other sound velocities are either fixed or manually set, for example, using the keyboard 22 and the mouse 23. To be specific, for example, a variable range and a variable spacing of sound velocity are set using, for example, the keyboard 22 and the mouse 23 and, based on the settings, other sound velocities are set.

Though the number of other sound velocities, that is, the number of sub-flaw detection images is preferably large for the purpose of recognizing echo variation, it is necessary to take into consideration that, when the number is larger, the load of calculation is larger. In the present embodiment, the plural sub-flaw detection images include sub-flaw detection images 26B to 26D shown in FIGS. 5B to 5D. The sub-flaw detection image 26B shown in FIG. 5B is one generated using a medium sound velocity $C_M$ (specifically, an average of longitudinal sound velocity $C_L$ and transverse sound velocity $C_T$, where $C_L > C_M > C_T$) as sound velocity C for calculating ultrasonic wave propagation time (τmi+τni). The sub-flaw detection image 26C shown in FIG. 5C is one generated using a transverse sound velocity $C_T$ as sound velocity C for calculating ultrasonic wave propagation time (τmi+τni). The sub-flaw detection image 26D shown in FIG.

5D is one generated using a sound velocity $C_S$ (with $C_T > C_S$) as sound velocity C for calculating ultrasonic wave propagation time ($\tau mi + \tau ni$).

Next, in step S105, the computer 14 extracts echoes of interest which are shown in the sub-flaw detection images and which can be associated with the echo of interest shown in the main flaw detection image 26A as being attributable to a same reflection source. Specifically, for example, when an echo 27A is specified as an echo of interest in the main flaw detection image 26A, an echo 27B shown in the sub-flaw detection image 26B, an echo 27C shown in the sub-flaw detection image 26C and an echo 27D shown in the sub-flaw detection image 26D are extracted. Also, for example, when an echo 28A is specified as an echo of interest in the main flaw detection image 26A, an echo 28B shown in the sub-flaw detection image 26B, an echo 28C shown in the sub-flaw detection image 26C and an echo 28D shown in the sub-flaw detection image 26D are extracted.

Figure 6:
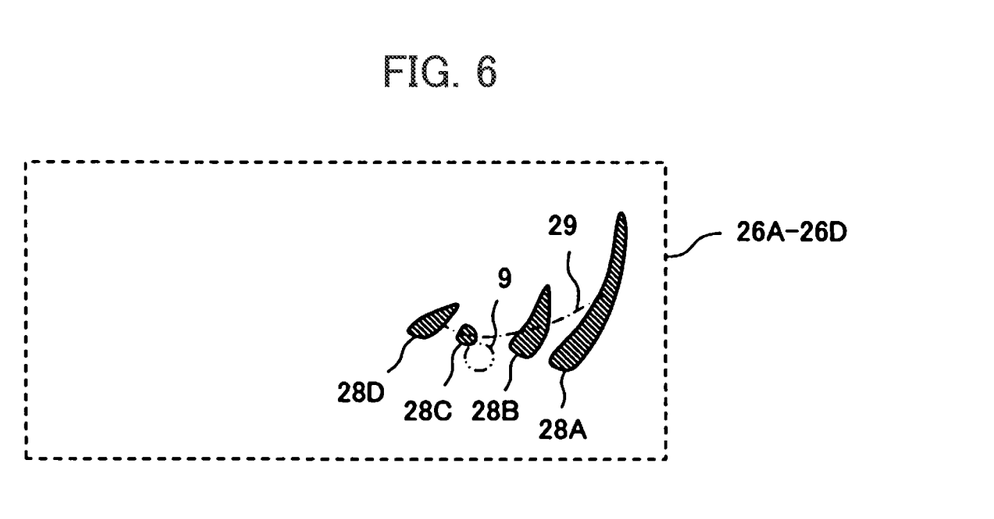
FIG. 6 is a diagram showing plural echoes respectively shown in plural flaw detection images and mutually associated as being attributable to a same reflection source according to the first embodiment of the present invention.

How to extract echoes of interest in sub-flaw detection images will be described below. The computer 14 sequentially selects two flaw detection images generated using two close sound velocities and extracts, as being attributable to a same reflection source, two echoes which both appear in the two flaw detection images, which are closely positioned and which have close area sizes. When many echoes of interest are extracted in the above manner, a path 29 passing through the positions of the echoes of interest as shown in FIG. 6 is drawn by calculation using, for example, a spline method or a least square method, and echoes in the vicinity of the path 29 are extracted as being attributable to a same reflection source. Note that an echo position represents, for example, a peak echo intensity position, and an area (effective area) of an echo represents, for example, an area in which the echo intensity varies from a peak value to a 50% value.

Next, in step S106, the computer 14 calculates the areas of the echoes of interest shown in the main flaw detection image and sub-flaw detection images. The display 15 may display the areas (see FIG. 7 or FIG. 8) of the echoes of interest shown in the main flaw detection image and sub-flaw detection images calculated by the computer 14. Subsequently, processing advances to step S107 and the computer 14 determines whether or not, among the areas of the echoes of interest shown in the main flaw detection image and sub-flaw detection images, the area of the echo of interest shown in the main flaw detection image is the smallest (in other words, the echo of interest having the smallest area among all the echoes of interest is selected and whether or not the flaw detection image showing the selected echo of interest is one generated using a longitudinal sound velocity is determined).

Figure 7:
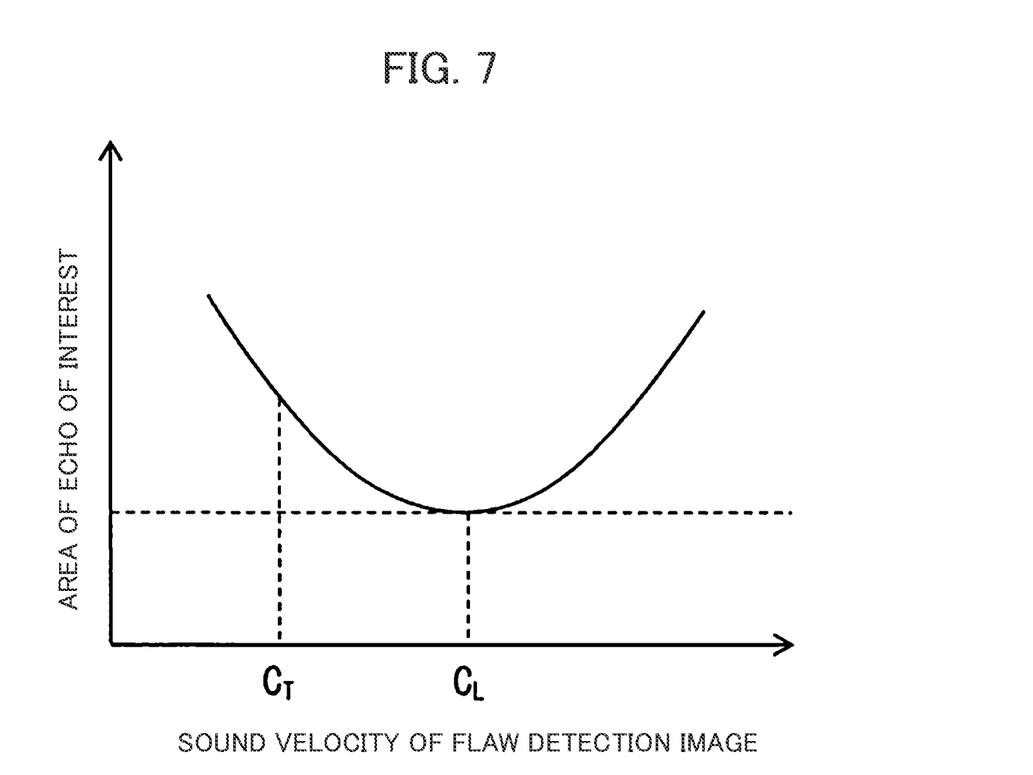
FIG. 7 is a diagram showing an example of area transition of an echo of interest according to the first embodiment of the present invention.

For example, when, of the echoes shown in the main flaw detection image 26A, the echo 27A is the specified echo of interest, the computer 14, in the step S106, calculates the areas of echo 27A shown in the main flaw detection image 26A, echo 27B shown in the sub-flaw detection image 26B, echo 27C shown in the sub-flaw detection image 26C, and echo 27D shown in the sub-flaw detection image 26D. The areas of these echoes show a tendency as represented in FIG. 7. Namely, since the area of the echo 27A shown in the main flaw detection image 26A is the smallest (in other words, since the flaw detection image showing the echo 27A whose area is the smallest is one generated using a longitudinal sound velocity), the determination made in the step S107 is YES, and processing advances to step S108. In the step S108, the computer 14 determines that the echo 27A shown in the main flaw detection image 26A is a longitudinal echo (true echo) and displays the determination on the display 15.

Figure 8:
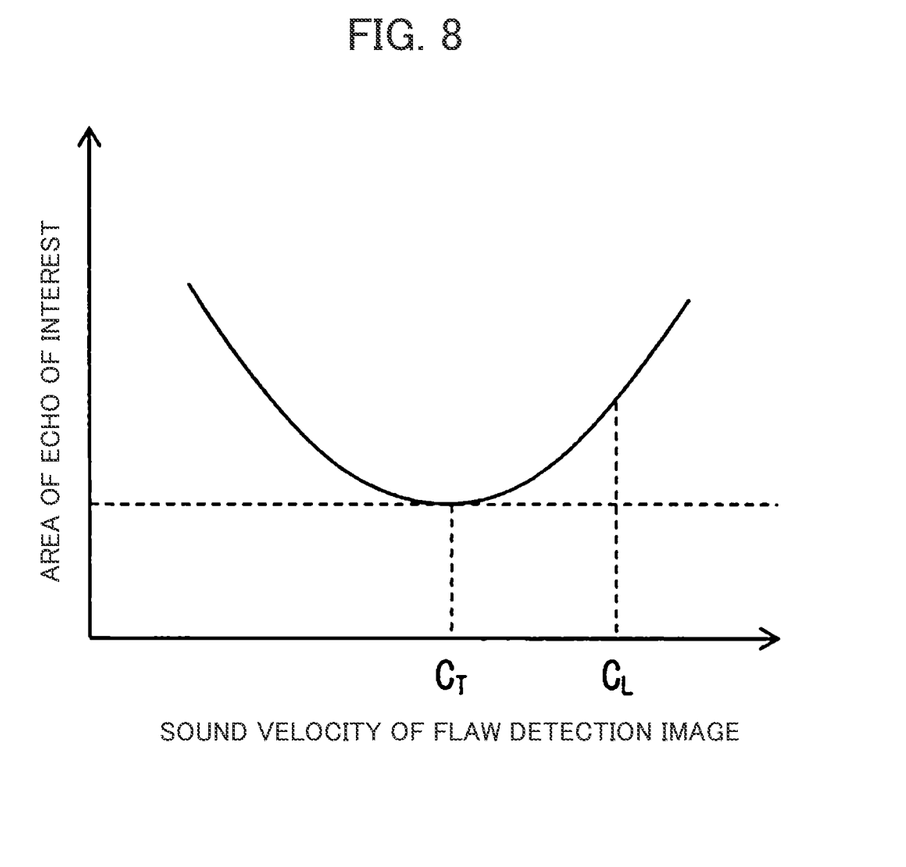
FIG. 8 is a diagram showing another example of area transition of an echo of interest according to the first embodiment of the present invention.

On the other hand, for example, when the echo 28A shown in the main flaw detection image 26A is the specified echo of interest, the computer 14, in the step S106, calculates the areas of echo 28A shown in the main flaw detection image 26A, echo 28B shown in the sub-flaw detection image 26B, echo 28C shown in the sub-flaw detection image 26C, and echo 28D shown in the sub-flaw detection image 26D. The areas of these echoes show a tendency as represented in FIG. 8. Namely, since the area of the echo 27C shown in the sub-flaw detection image 26C is the smallest (in other words, since the flaw detection image showing the echo 28C whose area is the smallest is not one generated using a longitudinal sound velocity), the determination made in the step S107 is NO and processing advances to step S109. In the step S109, the computer 14 determines that the echo 28A shown in the main flaw detection image 26A is a pseudo echo and displays the determination on the display 15.

As described above, according to the present embodiment, echoes shown in a main flaw detection image can be easily identified and, based on longitudinal echoes (true echoes) shown in the main flaw detection image, presence/absence and positions of flaws can be easily determined.

Figure 9:
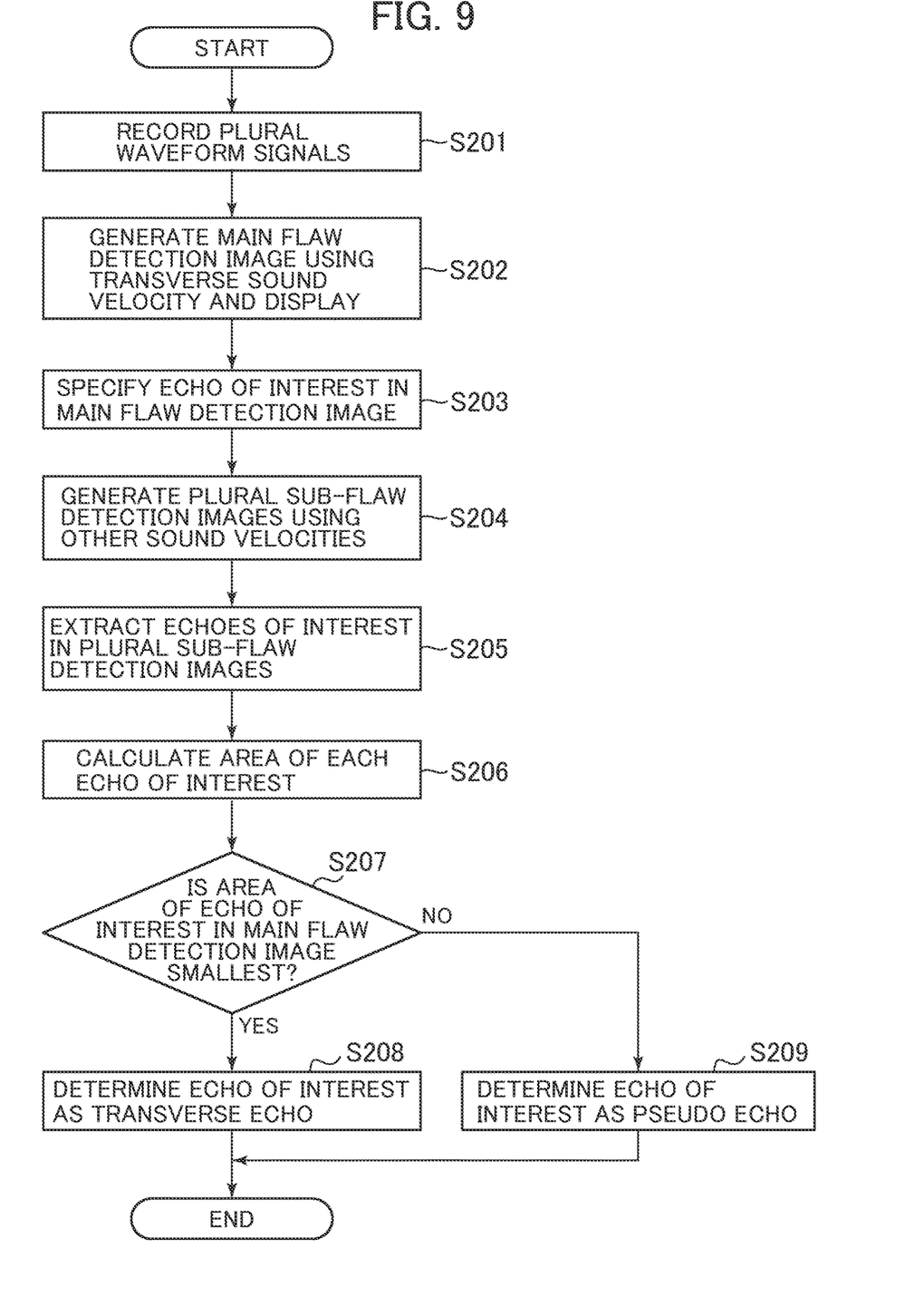
FIG. 9 is a flowchart showing the procedure of processing performed by the ultrasonic flaw detection apparatus according to a second embodiment of the present invention.

A second embodiment of the present invention will be described below with reference to FIG. 9. FIG. 9 is a flowchart showing the procedure of processing performed by the ultrasonic flaw detection apparatus of the second embodiment. In the second embodiment, a main flaw detection image is generated using a transverse sound velocity as a sound velocity for calculating ultrasonic wave propagation time. In the following description of the second embodiment, parts equivalent to those used in the first embodiment will be denoted by the same reference numerals as those used in connection with the first embodiment and description of such parts will be omitted as appropriate.

First in S201, by selecting combinations of transmitting elements and receiving elements out of the plural piezoelectric elements 11 and controlling the selected combinations, the ultrasonic flaw detection unit 13 records plural waveform signals corresponding to the combinations of transmitting elements and receiving elements. Subsequently, processing advances to S202 and the computer 14 generates a main flaw detection image 26C (see FIG. 5C) by using a transverse sound velocity $C_T$ as sound velocity C for calculating ultrasonic wave propagation time ($\tau mi + \tau ni$). The display 15 displays the main flaw detection image 26C generated by the computer 14. Subsequently, processing advances to S203 and an inspector specifies an echo of interest out of the plural echoes 27C and 28C shown in the main flaw detection image 26C using, for example, the keyboard 22 and the mouse 23.

Next, in S204, the computer 14 generates at least two sub-flaw detection images by selectively using at least two other sound velocities as sound velocity C for calculating ultrasonic wave propagation time ($\tau mi + \tau ni$). The display 15 may display the sub-flaw detection images generated by the computer 14.

Of the two other sound velocities, preferably one is higher than the transverse sound velocity $C_T$ and the other is lower than the transverse sound velocity $C_T$. Also, the at least two other sound velocities are either fixed or manually set using, for example, the keyboard 22 and the mouse 23. Though the number of other sound velocities, that is, the number of sub-flaw detection images is preferably large for the purpose of recognizing echo variation, it is necessary to take into consideration that, when the number is larger, the calculation load is larger. In the present embodiment, the plural sub-flaw detection images include sub-flaw detection images 26A, 26B and 26D shown in FIGS. 5A, 5B and 5D.

Next, in S205, the computer 14 extracts echoes of interest which are shown in the sub-flaw detection images and which can be associated with the echo of interest shown in the main flaw detection image 26C as being attributable to a same reflection source. Specifically, for example, when an echo 27C is specified as an echo of interest in the main flaw detection image 26C, an echo 27A shown in the sub-flaw detection image 26A, an echo 27B shown in the sub-flaw detection image 26B and an echo 27D shown in the sub-flaw detection image 26D are extracted. Also, for example, when an echo 28C is specified as an echo of interest in the main flaw detection image 26C, an echo 28A shown in the sub-flaw detection image 26A, an echo 28B shown in the sub-flaw detection image 26B and an echo 28D shown in the sub-flaw detection image 26D are extracted.

Next, in S206, the computer 14 calculates the areas of the echoes of interest shown in the main flaw detection image and sub-flaw detection images. The display 15 may display the areas (see FIG. 7 or FIG. 8) of the echoes of interest shown in the main flaw detection image and sub-flaw detection images calculated by the computer 14. Subsequently, processing advances to S207 and the computer 14 determines whether or not, among the areas of the echoes of interest shown in the main flaw detection image and sub-flaw detection images, the area of the echo of interest shown in the main flaw detection image is the smallest (in other words, the echo of interest having the smallest area among all the echoes of interest is selected and whether or not the flaw detection image showing the selected echo of interest is one generated using a transverse sound velocity is determined).

For example, when, of the echoes shown in the main flaw detection image 26C, the echo 28C is the specified echo of interest, the computer 14, in S206, calculates the areas of echo 28C shown in the main flaw detection image 26C, echo 28A shown in the sub-flaw detection image 26A, echo 28B shown in the sub-flaw detection image 26B, and echo 28D shown in the sub-flaw detection image 26D. The areas of these echoes show a tendency as represented in FIG. 8. Namely, since the area of the echo 28C shown in the main flaw detection image 26C is the smallest (in other words, since the flaw detection image showing the echo 28C whose area is the smallest is one generated using a transverse sound velocity), the determination made in S207 is YES and processing advances to S208. In S208, the computer 14 determines that the echo 28C shown in the main flaw detection image 26C is a transverse echo (true echo) and displays the determination on the display 15.

On the other hand, for example, when the echo 27C shown in the main flaw detection image 26C is the specified echo of interest, the computer 14, in S206, calculates the areas of echo 27C shown in the main flaw detection image 26C, echo 27A shown in the sub-flaw detection image 26A, echo 27B shown in the sub-flaw detection image 26B, and echo 27D shown in the sub-flaw detection image 27D. The areas of these echoes show a tendency as represented in FIG. 7. Namely, since the area of the echo 27A shown in the sub-flaw detection image 26A is the smallest (in other words, since the flaw detection image showing the echo 27A whose area is the smallest is not one generated using a transverse sound velocity), the determination made in S207 is NO and processing advances to S209. In S209, the computer 14 determines that the echo 27C shown in the main flaw detection image 26C is a pseudo echo and displays the determination on the display 15.

As described above, according to the present embodiment, echoes shown in a main flaw detection image can be easily identified and, based on transverse echoes (true echoes) shown in the main flaw detection image, presence/absence and positions of flaws can be easily determined.

Figure 10:
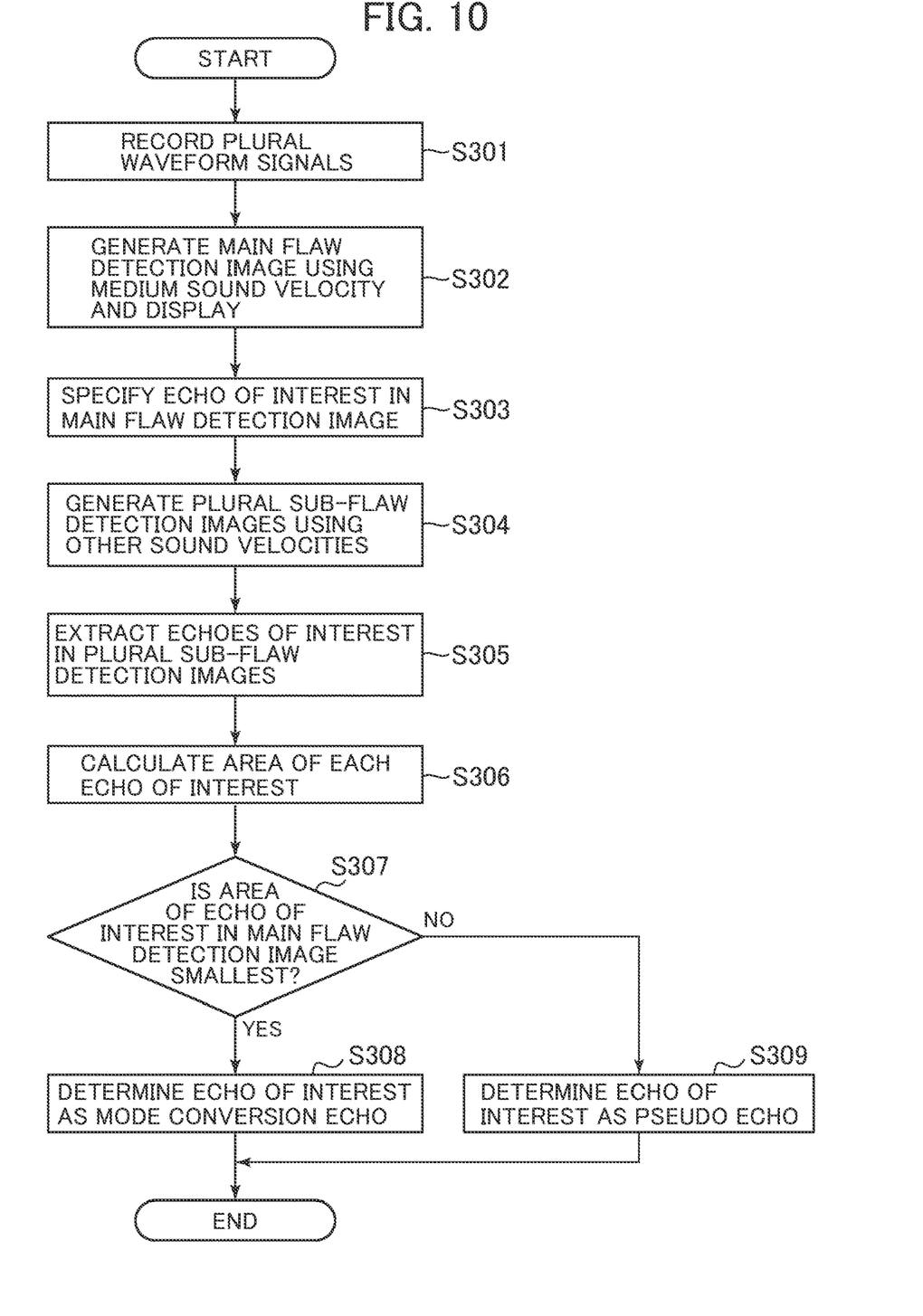
FIG. 10 is a flowchart showing the procedure of processing performed by the ultrasonic flaw detection apparatus according to a third embodiment of the present invention.

A third embodiment of the present invention will be described below with reference to FIG. 10. FIG. 10 is a flowchart showing the procedure of processing performed by the ultrasonic flaw detection apparatus of the third embodiment. In the third embodiment, a main flaw detection image is generated using a medium sound velocity as a sound velocity for calculating ultrasonic wave propagation time. In the following description of the third embodiment, parts equivalent to those used in the first embodiment will be denoted by the same reference numerals as those used in connection with the first embodiment and description of such parts will be omitted as appropriate.

First in S301, by selecting combinations of transmitting elements and receiving elements out of the plural piezoelectric elements 11 and controlling the selected combinations, the ultrasonic flaw detection unit 13 records plural waveform signals corresponding to the combinations of transmitting elements and receiving elements. Subsequently, processing advances to S302 and the computer 14 generates a main flaw detection image by using a medium sound velocity $C_M$ as sound velocity C for calculating ultrasonic wave propagation time (τmi+τni). The display 15 displays the main flaw detection image generated by the computer 14. Subsequently, processing advances to S303 and an inspector specifies an echo of interest out of the plural echoes shown in the main flaw detection image using, for example, the keyboard 22 and the mouse 23.

Next, in S304, the computer 14 generates at least two sub-flaw detection images by selectively using at least two other sound velocities as sound velocity C for calculating ultrasonic wave propagation time (τmi+τni). The display 15 may display the sub-flaw detection images generated by the computer 14.

Of the two other sound velocities, preferably one is higher than the medium sound velocity $C_M$ and the other is lower than the medium sound velocity $C_M$. Also, the at least two other sound velocities are either fixed or manually set using, for example, the keyboard 22 and the mouse 23. Though the number of other sound velocities, that is, the number of sub-flaw detection images is preferably large for the purpose of recognizing echo variation, it is necessary to take into consideration that, when the number is larger, the calculation load is larger.

Next, in S305, the computer 14 extracts echoes of interest which are shown in the sub-flaw detection images and which can be associated with the echo of interest shown in the main flaw detection image as being attributable to a same reflection source.

Next, in S306, the computer 14 calculates the areas of the echoes of interest shown in the main flaw detection image and sub-flaw detection images. The display 15 may display the areas of the echoes of interest shown in the main flaw detection image and sub-flaw detection images calculated by the computer 14. Subsequently, processing advances to S307 and the computer 14 determines whether or not, among the areas of the echoes of interest shown in the main flaw detection image and sub-flaw detection images, the area of the echo of interest shown in the main flaw detection image is the smallest (in other words, the echo of interest having the smallest area among all the echoes of interest is selected and whether or not the flaw detection image showing the selected echo of interest is one generated using a medium sound velocity is determined).

For example, when the area of the echo of interest shown in the main flaw detection image is the smallest (in other words, when the flaw detection image showing the echo of interest whose area is the smallest is one generated using a medium sound velocity), the determination made in S307 is YES, and processing advances to S308. In S308, the computer 14 determines that the echo of interest shown in the main flaw detection image is a mode conversion echo (true echo) and displays the determination on the display 15.

On the other hand, for example, when the area of the echo of interest shown in a sub-flaw detection image is the smallest (in other words, when the flaw detection image showing the echo of interest whose area is the smallest is not one generated using a medium sound velocity), the determination made in S307 is NO, and processing advances to S309. In S309, the computer 14 determines that the echo of interest shown in the main flaw detection image is a pseudo echo and displays the determination on the display 15.

As described above, according to the present embodiment, echoes shown in a main flaw detection image can be easily identified and, based on mode conversion echoes (true echoes) shown in the main flaw detection image, presence/absence and positions of flaws can be easily determined.

The first embodiment has been described based on an example case as follows: the computer 14 generates a main flaw detection image using a longitudinal sound velocity and at least two sub-flaw detection images using other sound velocities than the longitudinal sound velocity; calculates the areas of at least three echoes which are respectively shown in the generated flaw detection images and are associated as being attributable to a same reflection source; selects one of the at least three echoes whose area is the smallest; and determines that, when the selected echo is one shown in the main flaw detection image, the selected echo is a longitudinal echo and that, when the selected echo is one shown in a sub-flaw detection image, the selected echo is a pseudo echo. However, the invention is not limited to the above example case and can be modified without departing from the spirit and technical ideas of the present invention. For example, when there is a sub-flaw detection image generated using a transverse sound velocity, the computer 14 may determine whether or not a pseudo echo is a transverse echo according to whether or not the sub-flaw detection image showing the pseudo echo is one generated using a transverse sound velocity and may display the determination on the display 15. Also, for example, when there is a sub-flaw detection image generated using a medium sound velocity, the computer 14 may determine whether or not a pseudo echo is a mode conversion echo according to whether or not the sub-flaw detection image showing the pseudo echo is one generated using a medium sound velocity and may display the determination on the display 15.

The second embodiment has been described based on an example case as follows: the computer 14 generates a main flaw detection image using a transverse sound velocity and at least two sub-flaw detection images using other sound velocities than the transverse sound velocity; calculates the areas of at least three echoes which are respectively shown in the generated flaw detection images and are associated as being attributable to a same reflection source; selects one of the at least three echoes whose area is the smallest; and determines that, when the selected echo is one shown in the main flaw detection image, the selected echo is a transverse echo and that, when the selected echo is one shown in a sub-flaw detection image, the selected echo is a pseudo echo. However, the invention is not limited to the above example case and can be modified without departing from the spirit and technical ideas of the present invention. For example, when there is a sub-flaw detection image generated using a longitudinal sound velocity, the computer 14 may determine whether or not a pseudo echo is a longitudinal echo according to whether or not the sub-flaw detection image showing the pseudo echo is one generated using a longitudinal sound velocity and may display the determination on the display 15. Also, for example, when there is a sub-flaw detection image generated using a medium sound velocity, the computer 14 may determine whether or not a pseudo echo is a mode conversion echo according to whether or not the sub-flaw detection image showing the pseudo echo is one generated using a medium sound velocity and may display the determination on the display 15.

The third embodiment has been described based on an example case as follows: the computer 14 generates a main flaw detection image using a medium sound velocity and at least two sub-flaw detection images using other sound velocities than the medium sound velocity; calculates the areas of at least three echoes which are respectively shown in the generated flaw detection images and are associated as being attributable to a same reflection source; selects one of the at least three echoes whose area is the smallest; and determines that, when the selected echo is one shown in the main flaw detection image, the selected echo is a mode conversion echo and that, when the selected echo is one shown in a sub-flaw detection image, the selected echo is a pseudo echo. However, the invention is not limited to the above example case and can be modified without departing from the spirit and technical ideas of the present invention. For example, when there is a sub-flaw detection image generated using a longitudinal sound velocity, the computer 14 may determine whether or not a pseudo echo is a longitudinal echo according to whether or not the sub-flaw detection image showing the pseudo echo is one generated using a longitudinal sound velocity and may display the determination on the display 15. Also, for example, when there is a sub-flaw detection image generated using a transverse sound velocity, the computer 14 may determine whether or not a pseudo echo is a transverse echo according to whether or not the sub-flaw detection image showing the pseudo echo is one generated using a transverse sound velocity and may display the determination on the display 15.

Although not particularly described above, the computer 14 may confirm a result of echo identification by using a different echo identification method. Specifically, the computer 14 may select, out of at least three echoes which are respectively shown in at least three flaw detection images and are associated as being attributable to a same reflection source, one closest to the position of a known reflection source and may identify the selected echo according to whether or not the flaw detection image showing the selected echo is one generated using one of a longitudinal sound velocity, a transverse sound velocity and a medium sound velocity. To be specific with reference to echoes 28A to 28D shown in FIG. 6, when the position of reflection source 9 is known, the computer 14 may select echo 28C closest to the reflection source 9 and may determine whether or not the echoes 28A to 28D are transverse echoes according to whether or not the flaw detection image 26C showing the echo 28C is one generated using a transverse sound velocity.

What is claimed is:

1. An ultrasonic flaw detection method:
   in which an array sensor including a plurality of piezoelectric elements is used;
   in which, by selecting combinations of transmitting elements and receiving elements included in the piezoelectric elements, causing the transmitting elements to transmit ultrasonic waves to an inspection object and obtaining waveform signals generated by converting ultrasonic waves reflected from the inspection object and received by the receiving elements, a plurality of waveform signals corresponding to the combinations of the transmitting elements and receiving elements are recorded; and
   in which, for each position in the inspection object, when it is assumed that ultrasonic waves are reflected from the each position, intensities of plural waveform signals reflected from the each position are extracted based on the propagation time of ultrasonic waves corresponding to the combinations of the transmitting elements and receiving elements, the extracted intensities are totalized, and a flaw detection image showing distribution of totalized intensities is generated, the ultrasonic flaw detection method comprising the steps of:
   generating at least three flaw detection images by selectively using, as sound velocities for calculating propagation time of the ultrasonic waves, at least three sound velocities including one of a longitudinal sound velocity, a transverse sound velocity and a medium sound velocity which is an average of the longitudinal and transverse sound velocities;
   calculating areas of at least three echoes respectively shown in the at least three flaw detection images, the at least three echoes being associated as being attributable to a same reflection source; and
   selecting, out of the at least three echoes, an echo whose area is the smallest and identifying the selected echo according to whether or not the flaw detection image showing the selected echo is one generated using one of a longitudinal sound velocity, a transverse sound velocity and a medium sound velocity.

2. The ultrasonic flaw detection method according to claim 1,
   wherein whether or not the selected echo is a longitudinal echo is determined according to whether or not the flaw detection image showing the selected echo is one generated using a longitudinal sound velocity.

3. The ultrasonic flaw detection method according to claim 1,
   wherein whether or not the selected echo is a transverse echo is determined according to whether or not the flaw detection image showing the selected echo is one generated using a transverse sound velocity.

4. The ultrasonic flaw detection method according to claim 1,
   wherein whether or not the selected echo is a mode conversion echo is determined according to whether or not the flaw detection image showing the selected echo is one generated using a medium sound velocity.

5. The ultrasonic flaw detection method according to claim 1,
   wherein, out of the at least three echoes, one shown closest to a known reflection source is selected and the selected echo is identified according to whether or not the flaw detection image showing the selected echo is one generated using one of a longitudinal sound velocity, a transverse sound velocity and a medium sound velocity.

6. An ultrasonic flaw detection apparatus, comprising:
   an array sensor including a plurality of piezoelectric elements;
   an ultrasonic flaw detection unit which, by selecting combinations of transmitting elements and receiving elements included in the piezoelectric elements, causing the transmitting elements to transmit ultrasonic waves to an inspection object and obtaining waveform signals generated by converting ultrasonic waves reflected from the inspection object and received by the receiving elements, records a plurality of waveform signals corresponding to the combinations of the transmitting elements and receiving elements; and
   a computer which, for each position in the inspection object, when it is assumed that ultrasonic waves are reflected from the each position, extracts intensities of plural waveform signals reflected from the each position based on the propagation time of ultrasonic waves corresponding to the combinations of transmitting elements and receiving elements, totalizes the extracted intensities and generates a flaw detection image showing distribution of totalized intensities,
   wherein the computer:
   generates at least three flaw detection images by selectively using, as sound velocities for calculating propagation time of the ultrasonic waves, at least three sound velocities including one of a longitudinal sound velocity, a transverse sound velocity and a medium sound velocity which is an average of the longitudinal and transverse sound velocities;
   calculates areas of at least three echoes respectively shown in the at least three flaw detection images, the at least three echoes being associated as being attributable to a same reflection source; and
   selects, out of the at least three echoes, an echo whose area is the smallest and identifies the selected echo according to whether or not the flaw detection image showing the selected echo is one generated using one of a longitudinal sound velocity, a transverse sound velocity and a medium sound velocity.

7. The ultrasonic flaw detection apparatus according to claim 6,
   wherein the computer determines whether or not the selected echo is a longitudinal echo according to whether or not the flaw detection image showing the selected echo is one generated using a longitudinal sound velocity.

8. The ultrasonic flaw detection apparatus according to claim 6,
   wherein the computer determines whether or not the selected echo is a transverse echo according to whether or not the flaw detection image showing the selected echo is one generated using a transverse sound velocity.

9. The ultrasonic flaw detection apparatus according to claim 6,
   wherein the computer determines whether or not the selected echo is a mode conversion echo according to whether or not the flaw detection image showing the selected echo is one generated using a medium sound velocity.

10. The ultrasonic flaw detection apparatus according to claim 6,
    wherein, out of the at least three echoes, the computer selects one shown closest to a known reflection source and identifies the selected echo according to whether or not the flaw detection image showing the selected echo is one generated using one of a longitudinal sound velocity, a transverse sound velocity and a medium sound velocity.

* * * * *